Figure 1:
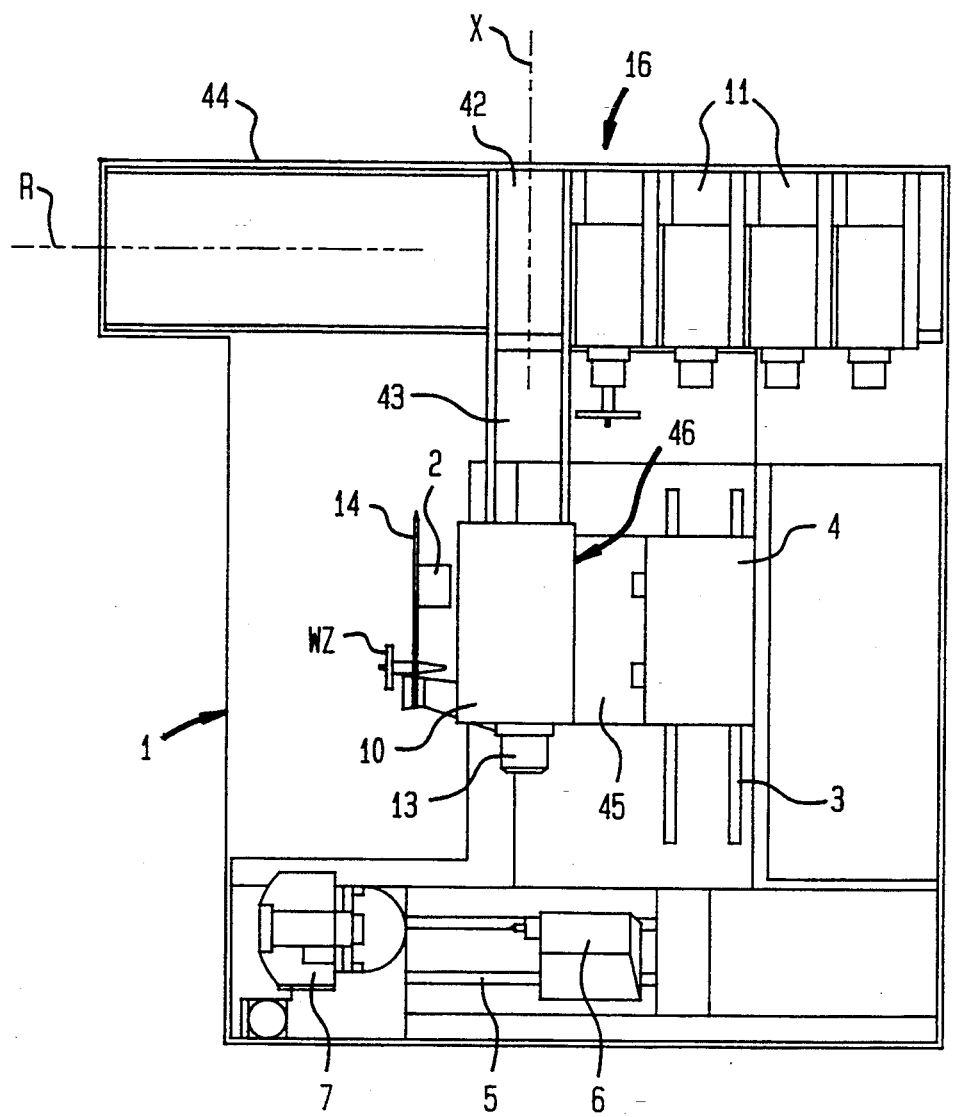

United States Patent [19]

Klicpera et al.

[11] Patent Number: 5,437,592
[45] Date of Patent: Aug. 1, 1995

[54] MACHINE TOOL CHANGER

[75] Inventors: Udo Klicpera, Pfronten; Bernd Schlieter, Eichingen, both of Germany

[73] Assignee: Schiess Kopp Werkzeugmaschinen GmbH

[21] Appl. No.: 256,855

[22] PCT Filed: Feb. 5, 1993

[86] PCT No.: PCT/DE93/00100

§ 371 Date: Jul. 27, 1994

§ 102(e) Date: Jul. 27, 1994

[87] PCT Pub. No.: WO93/15874

PCT Pub. Date: Aug. 19, 1993

[30] Foreign Application Priority Data

Feb. 8, 1992 [DE] Germany .............. 9201595 U

[51] Int. Cl.⁶ .............................................. B23Q 3/157
[52] U.S. Cl. ................................. 483/40; 294/110.1; 294/116; 483/902
[58] Field of Search ............ 483/36, 31, 38, 40, 483/902, 47, 48, 69, 39; 294/104, 106, 116, 110.1

[56] References Cited

U.S. PATENT DOCUMENTS

| | | |
|---|---|---|
| 3,555,963 | 1/1971 | General . |
| 3,845,546 | 11/1974 | Rutschke ............... 483/31 |
| 3,862,776 | 1/1975 | Sims et al. ............ 294/104 |
| 4,372,728 | 2/1983 | Kunio . |
| 4,609,326 | 9/1986 | Roesler ............... 483/902 |

FOREIGN PATENT DOCUMENTS

| | | |
|---|---|---|
| 0204151 | 12/1986 | European Pat. Off. . |
| 396913 | 11/1990 | European Pat. Off. ....... 483/902 |
| 1563794 | 4/1969 | France . |
| 2251012 | 5/1974 | Germany . |
| 926503 | 5/1963 | United Kingdom . |
| 2028187 | 3/1980 | United Kingdom . |
| 614940 | 7/1978 | U.S.S.R. ............... 483/902 |
| 837855 | 6/1981 | U.S.S.R. ............... 294/116 |
| 865600 | 9/1991 | U.S.S.R. ............... 483/902 |

OTHER PUBLICATIONS

Patent Abstracts of Japan, vol. 14, No. 144, Mar. 19, 1990, JP-A 20 09 548 (Fanuc).
Patent Abstracts of Japan, vol. 5, No. 47, Mar. 28, 1981, JP-A 56 003 160.
Patent Abstracts of Japan, vol. 2, No. 5, Mar. 28, 1981, JP-A 52 118 758 (Okuma).
Patent Abstracts of Japan, vol. 1, No. 125, Oct. 19, 1977, JP-A 52 061 879 (Okuma).
Patent Abstracts of Japan, vol. 3, No. 20, Feb. 20, 1979, JP-A 53 145 175 (Toyoda).

*Primary Examiner*—William Briggs
*Attorney, Agent, or Firm*—Henry M. Feiereisen

[57] ABSTRACT

Device for metal cutting a workpiece in a clamping fixture by using tools (WZ) which are removable in alternating sequence from a tool magazine with a sequence control of the machining steps and with a tool spindle unit changing device (4) and with a tool changing device comprised of a movable and rotatable as well as pivotable tongs-type grasp (ZG), the grab jaws (28, 29) of which being aligned to the respective tool removal axis and spindle axis (Z), and a mirror-image jaw profile (30) to receive tools (WZ) with more than two different shank or taper sizes with at least three adjoining arched sections (a, b, d), the radii (ERa, ERb, ERd) of which match the different diameters of at least three shank or taper sizes, and in which the tool spindle unit (10) which is in the working position is insertable into and removable from a receptacle and exchanged for a tool spindle unit (11) in a stand-by position. The at least three arched sections (a, b, d) of the grab jaws (28, 29) are at a distance (f) from the generating arcs which lie with their centers of circle (Ma, Mb, Md) on an opening arc (KB) which intersects the feed and removal axis (x), and which has a generating center (MKB) coinciding with the pivot point (D) of the grab jaws (28, 29).

27 Claims, 9 Drawing Sheets

MACHINE TOOL CHANGER

The invention refers to a device for metal cutting a workpiece in a clamping fixture by tools which are removable in alternating sequence from a tool magazine to occupy their working position. Such devices are known, and devices were introduced which enable the workpiece to be machined in a clamping fixture sequentially with several different tools, with the various tools usually disposed in one or more tool holders e.g. a turret head, and then readied for use through turning and/or shifting of the tool holder.

Moreover, also such devices are known in which the tools provided for use are readied in tool magazines. Various structures of such magazines are known e.g. drum or disk magazine, chain magazine, rack magazine etc. Although devices of this type with tool magazines enable a continuous provision of freshly reground or aligned tools, there is still a need for particular tool changing units because they cannot be brought in machining position by means of the magazines. In these devices, the tools are placed by particular changing tongs from the magazine into the tool holder or spindle and used there after previously removing the tool to be replaced.

Tool magazine and changing unit ensure an automatic tool supply which is suited to the respective machining task.

In connection with tool changing units, machining centers provide also the basis for higher automation stages (flexible manufacturing cells and manufacturing systems). A particular difficulty is encountered when successively using tools which considerably deviate in size and structure and when providing these tools with differently sized shank diameters, Morse tapers or steep cone—(SK)—sizes. Then, changing units must be used which are designed to remove these differently configured tools with varying tool shank diameters or SK sizes from the magazine and to feed them to the tool holder or spindle and to insert them therein.

In these cases, it is certainly also required to provide respective arrangements in order to position the differently sized tools for use also with differently designed tool holders or spindles in varying sizes.

Devices of this type are thus suitable for removing the tools from a tool magazine and for supplying the tool and insertion thereof in a tool holder or spindle to bring them in machining position. Therefore, they are provided with a tool changing unit for drilling tools, milling tools and grinding tools and with a tool spindle unit changing apparatus as well as a control unit for clocked sequence control of algorithmically preset machining steps until reaching the finished size of the workpiece.

In the event, the tool axis in the magazine and the spindle axis do not extend parallel to each other, the use of an angled double-armed grab was required to date.

Starting out from these realities of the prior art, the invention is based on the idea that as of yet no devices are known which enable a so-called chaotic manufacture in a configuration as flexible manufacturing cell or fully automatic machining center, with various workpieces being machined fully automatically with most different tools in a same manufacturing system in a clamping fixture at random sequence by means of a greater number of machining steps until reaching the finished size of the workpiece. Thereby, drilling work, turning work, milling work and grinding work should be executable.

The invention is thus based on the object to create a device for metal cutting a workpiece in a clamping fixture by tools which are removable from a tool magazine to occupy in alternating sequence their working position, with the device being provided with a control unit for clocked sequence control of the algorithmically preset machining steps until reaching the finished size of the workpiece and with a tool spindle unit changing apparatus for drilling tools, milling tools, turning tools and grinding tools, which is comprised of a power-operated movable and rotatable as well as pivotable tongs-type grab having grab jaws which can be aligned with respect to the respective tool removal axis and the spindle axis, with the device being further developed in such a manner that tools of different structure and differently sized shank sizes or taper sizes can be used in random sequence for the workpiece.

The solution according to the invention is based on a device of this type and is attained by providing the grab jaws of the tongs-type grab with a mirror-image jaw profile for receiving tools with different shank sizes or taper sizes, with each jaw profile having at least three adjoining arched sections a, b, d, the radii of which matching the different diameters of the shank sizes or taper sizes, and moreover by spacing the arched sections by a distance relative to the pertaining generating arcs, the generating radii of which being greater by the distance than the radii of the arched sections.

The embodiment of the tongs-type grab according to the invention allows a removal of tools with different shank diameters from a magazine and insertion in a spindle. The tool magazine may be designed as disk magazine, drum magazine, chain magazine or rack magazine. This is attained through geometric configuration of the grab jaws by which in both its end positions the grab jaw is always ready for operation in the removal or feed axis for different sizes of the tool shank or the taper.

The tongs-type grab is designed in accordance with the invention in such a manner that the arched sections a, b, d are spaced by a distance from the pertaining generating arcs, the respective generating radii of which being greater by this distance than the radii of the arched sections a, b, d, with the centers of circle of the generating arcs as well as the center of circle of a further generating arc with its generating radius extending on an opening arc which intersects the feed and removal axis and has a generating center of circle coinciding with the pivot point of the swingable grab jaws and upon which the center of circle of all generating arcs for the various shank and upon which the center of circle of all generating arcs for the various shank diameters of the tools being grasped coincide at the respective opening widths of the grab jaws with the feed and removal axis.

In accordance with further features of the tongs-type grab, all generating radii define a first point of intersection in which the generating arcs meet, and each two neighboring generating radii define a second and a third point of intersection, and that the generating arcs extend between these points of intersection and that the generating arc with the greatest generating radius extends from the first point of intersection in direction of the pivot bearing.

Advantageously, the power-operated grab jaws are retained in pivot bearings in a base plate which is pivotable by 90° or 180°, and two tongs-type grabs oppose each other as mirror images upon a longitudinal axis of the grab. Furthermore, it is advantageous in accordance with the invention to complement the base plate by means of a cover plate to a (closed) grab housing which includes on both sides openings for receiving the grab jaws, with the grab jaws being retracted in their greatest opening position with their outer jaw ends into the openings of the grab housing.

Moreover, it is proposed according to the invention to angle the outer jaw ends of the grab in the greatest opening position between 15° and 25° relative to a transverse axis which intersects the pivot bearing and extends perpendicular to the longitudinal axis of the grab. The drive of the grab jaws is provided in accordance with a further proposal of the invention in such a manner that each pair of grab jaws is associated with a separate piston-cylinder unit, with each of the piston rods thereof being connected with a longitudinally shiftable abutment of a compression spring arrangement which exerts a closing pressure upon the grab jaws and with a transfer element which executes a piston stroke in opening direction in opposition to the spring pressure. Through this design, the tools are securely held within the tongs-type grab even at pressure fluid breakdown and/or circuit failure.

According to further essential features, it is provided to incorporate between the abutment and the grab jaws a compressor which has pressure lugs on both sides for slidingly transmitting the closing pressure of the compression springs onto the grab jaws along their rearwardly formed profile curve, and, above all, furthermore to provide both grab jaws on the rear side with projections which oppose each other as mirror images and include adjoining, stepped lock-in teeth, and between which a catch connected to the abutment is insertable. This measure accomplishes several advantages. Not only the grab jaws but also the elements provided for their movement represent parts subjected to wear which should be replaceable from time to time without complicated work. Therefore, a grab jaw drive with a joint-kinematics is omitted as such must be completely replaced when showing wear. In contrast thereto, the jaw drive according to the invention is free of joints and is accomplished merely by means of pressure members. The compressor which is separated from the drive elements is easily replaceable as are the grab jaws.

Through engagement of a catch between the lock-in teeth of the grab jaws, it is avoided in connection with the four (or also more) grab jaw closing widths that the compression springs effecting the closing motion must permanently provide the full closing pressure, because the grab jaws are supported by the locking mechanism. Moreover, in accordance with a further feature of the invention, sets of compression springs, preferably selected in form of sets of disk springs are incorporated between the abutment and the compressor. This arrangement not only compensates inaccuracies (e.g. due to wear) of the closing elements of the tongs but moreover—based upon the locking of the grab jaws as described above—accomplishes an even contact pressure upon the trapezoidal grooves or the shanks of the tools.

Since the drive for moving the jaws is free of joints, a mechanism for providing an opening motion in opposition to the force of the closing springs is required. This is accomplished by providing the transfer element which is connected with the abutment, bilaterally—for each grab jaw—with slotted guides in which return pins mounted on the grab jaws slide.

The mode of operation of this grab tongs in connection with the tool magazine is especially simple and technically less complicated in accordance with the invention by a) the arrangement of the tongs-type grab pivotable about a horizontal axis on a console which is rotatable about a vertical axis by means of a power drive, and which b) travels back and forth on a guiding path by at least one stroke step in direction parallel to the tool receiving axis or spindle axis.

Through this configuration, it is possible to eliminate the use of an angled double-armed grab when the tool axes do not extend parallel to each other in the tool magazine and the spindle axis and to use instead the tongs-type grab according to the invention. The tool change can be rapidly executed so that only brief stops of the machining process are experienced.

The first advantageous design is characterized in that in the initial position of the double tongs-type grab a first tool situated in the tool magazine is grasped by the first tongs grab and through movement by about the first stroke step and turning of the console by 90° about the vertical axis a second tool situated in the spindle is grasped by the second tongs and pulled out from the spindle through a second stroke step, and that subsequently the first tool is positioned before the spindle through pivoting of the tongs-type grab by 180° about the horizontal axis and insertable in the spindle by executing a—third—reversing stroke step, and thereafter through turning back of the console by 90° about the vertical axis and traveling about the reversing stroke step is movable into the initial position in which the second tool is insertable into the tool magazine.

This embodiment of the coacting units, in particular the motion pattern of the console of the tongs-type grab, limited to a forward stroke and return stroke and a reversing by 180° of the double tongs-type grab in connection with the return stroke for the tool spindle unit creates a particular easy to control configuration which offers also a great degree of safety back up. Also the purely apparative complexity regarding the required motion mechanics and the drives is simple and clear.

A variation in which the return and forward stroke steps of the tool spindle unit are not required but all motion patterns are executed by the tongs-type grab combination is—as will be described hereinafter—characterized in that in the initial position of the double tongs-type grab a first tool situated in the tool magazine is grasped by the first tongs and through movement by a stroke step and turning of the console by 90° about the vertical axis a second tool situated in a spindle is grasped by the second tongs and pulled out from the spindle through a return stroke step of the tool spindle unit, and that subsequently through pivoting of the tongs-type grab by 180° about the horizontal axis the first tool is positioned before the spindle and inserted in the spindle through execution of a—further—reversing return stroke step, and thereafter through turning back of the console by 90° about the vertical axis and traveling about the reversing stroke step is moved into the initial position in which the second tool is insertable in the tool magazine.

The structural configuration of the tool changing apparatus allows also a third and fourth variation of the motion pattern. The difference to both previously described solutions resides essentially in its availability for use with tools of particular great diameter which conceivably could obstruct the pivoting of the console with the double tongs-type grab from the magazine plane into the transverse plane to the tool spindle. In the above described tool changing operations, the diameter of the tools may thus be limited to a certain maximum size when refusing to accept a greater dimensioning of the shifting paths. This difficulty is overcome to a certain degree by means of the subsequently described solution which is also applicable to both first-mentioned variations and is characterized in that in the initial position of the tongs-type grab a first tool situated in the tool magazine is grasped by the first tongs and that through traveling about a first stroke step and pivoting by 90° about the vertical axis and returning of the tongs-type grab by 90° about the horizontal axis a second tool situated in the spindle is grasped by the second tongs and pulled out from the spindle by a second stroke step, and that subsequently through pivoting of the tongs-type grab by 180° about the horizontal axis the first tool is positioned before the spindle and inserted in the spindle through execution of a—third—reversing stroke step, and thereafter is moved through pivoting of the tongs-type grab by 90° about the horizontal axis and turning back of the console by 90° about the vertical axis, returning of the tongs-type grab by 90° about the horizontal axis and traveling about the reversing stroke step into the initial position in which the second tool is insertable in the tool magazine.

In accordance with a very important feature of the invention with regard to the design of the device for a highly automated manufacturing center relates to the device part for changing the tool spindle units, with the design being applicable to the device part for changing the tools between the tool magazine and the tool spindle or tool spindle unit, respectively disposed in the working position which device part includes a power-operated movable and rotatable as well as pivotable tongs-type grab, with its openable and closable grab jaws being aligned to the respective tool removal axis and the spindle axis. On the basis thereof, the tool spindle unit changing apparatus according to the invention is provided with a vertical column console arranged on a common machine stand as well as with a tool spindle unit operatively connected detachably and exchangeable with the column console and a (first) movement path underneath the tool spindle unit which is operatively connected with the column console for directional displacement of the tool spindle unit detached from the column console from its working position into a stand-by position which is spaced from the column console.

This solution includes a device part which combines the common tool stand unit with the device part for rapid automated changing of the tools and which adds a further dimension with regard to selection of sequentially used tools. There is no need to select the tools on the basis of available tool holder or spindle of the tool spindle but all needed machining works can be executed with different tools in random sequence in a same workpiece clamping fixtures regardless of the tool size and its taper or shank size.

The movement path may be designed as rail track, and the tool spindle units may be provided with rollers for guidance thereon. Moreover, it is possible to arrange special rolling containers which travel on the rail track for receiving tool spindle units and for transporting, e.g. lifting, them into a stand-by position. Also, the movement path may be designed as suspension path by which the tool spindle units are lowered into their stand-by position.

In accordance with a modification thereof, the movement path may be substituted by a belt conveyor or plate conveyor for lowering the tool spindle units and for lifting them in the area stand-by position or for shifting them to the side.

In accordance with a preferred embodiment, the movement path is a railroad-like rail track on which the tool spindle units easily travel via sliding means or rollers, with the movement path including in accordance with a further proposal an elevatable and lowerable section beneath the working position of the tool spindle unit which is arranged on the column console. This section is lifted below the tool spindle unit for receiving same so that the connection to the column console can be separated and the tool spindle unit rests on the movement path or on a rolling container traveling thereon. In accordance with a modified embodiment of the invention, the column console or its adapter element for the detachable connection with the tool spindle unit may be lowerable from the respective working position so that the tool spindle unit being replaced can be lowered onto the movement path and advanced from there.

Depending on the selected configuration of the movement path and its characteristics—as described above for example as conveyer or as suspension track—the movement path is sufficient for receiving and transporting and feeding of the tool spindle units being respectively replaced because they can be transferred in a stand-by position by other additional lifting tools or transfer devices.

In accordance with a preferred embodiment, the arrangement is provided in such a manner that the (first) movement path has on its end a branch or a rotating disk which is connected to a further (second) movement path designed as stand-by position for a plurality of tool spindle units or leading thereto, with a particularly advantageous arrangement being created in such a manner that the first movement path is rectilinear, and the second movement path which is connected to the end thereof at a right angle at both sides is designed as stand-by position for a plurality of tool spindle units. In this manner, the tool spindle units with different tool receptacles or spindle and provided in stand-by position become accessible at all times for differently sized tools; then, it is also possible to replace the tool spindles in case of need or to provide them with particular holding fixtures for special tools.

In accordance with further advantageous particulars of the device according to the invention, the tool spindle units are provided with a synchronous motor arranged directly on the spindle shaft and are speed-controlled by a frequency converter. Moreover, an exchange of the tool spindle units is further especially simplified when, according to a further feature, the adapter element of the column console and the attachment surface of the tool spindle units are provided with remote controlled, pressure fluid operated fitting devices and armature devices and quick connections for the current transmissions.

In a machining center designed in accordance with the invention, the tool magazine, the tool changing unit and the changing device for the tool spindle units ensure an automatic, essentially freely shapeable tool supply in accordance with the respective machining tasks; thus, the basis for high automation stages is established.

Figure 2:
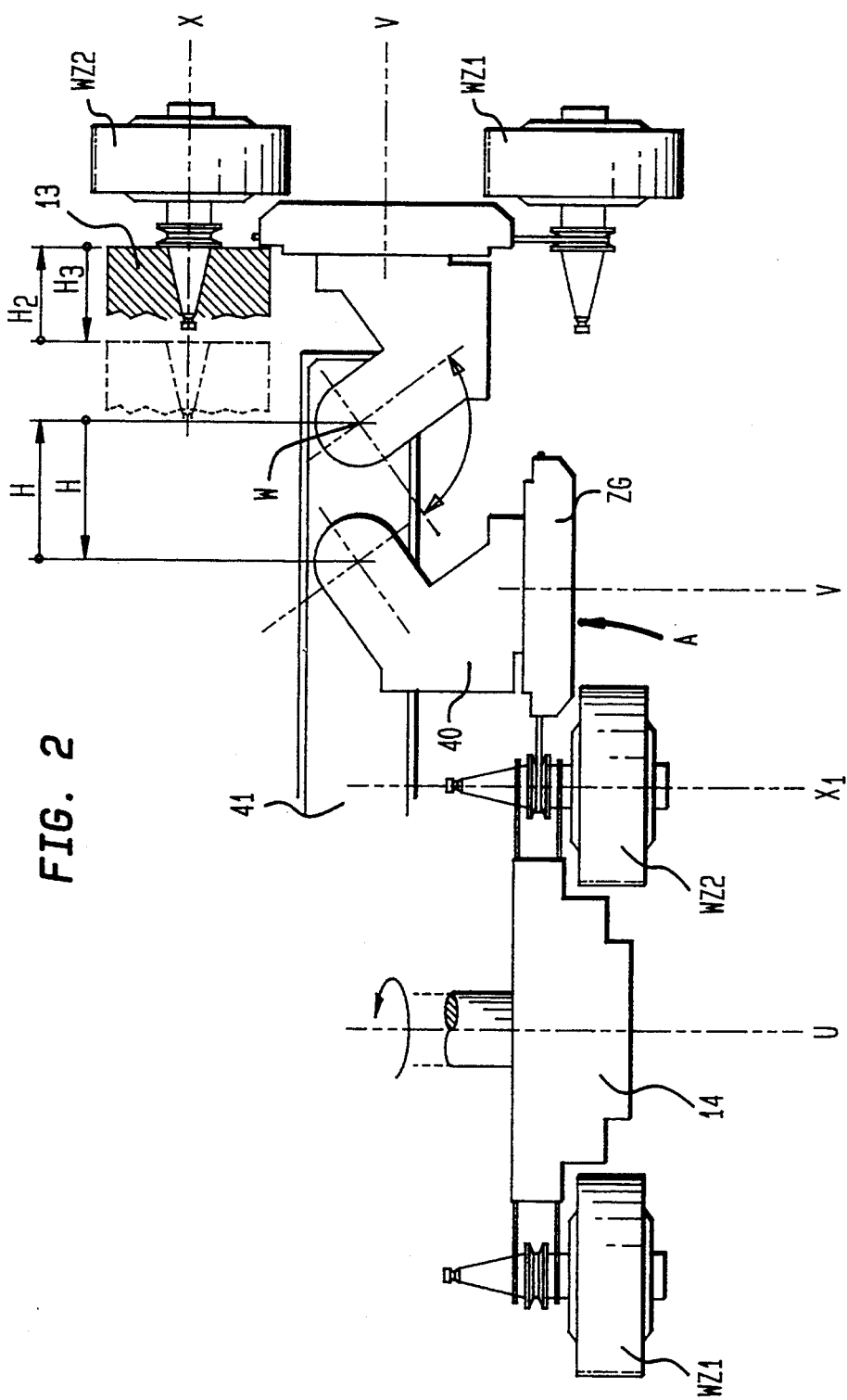
Figure 3:
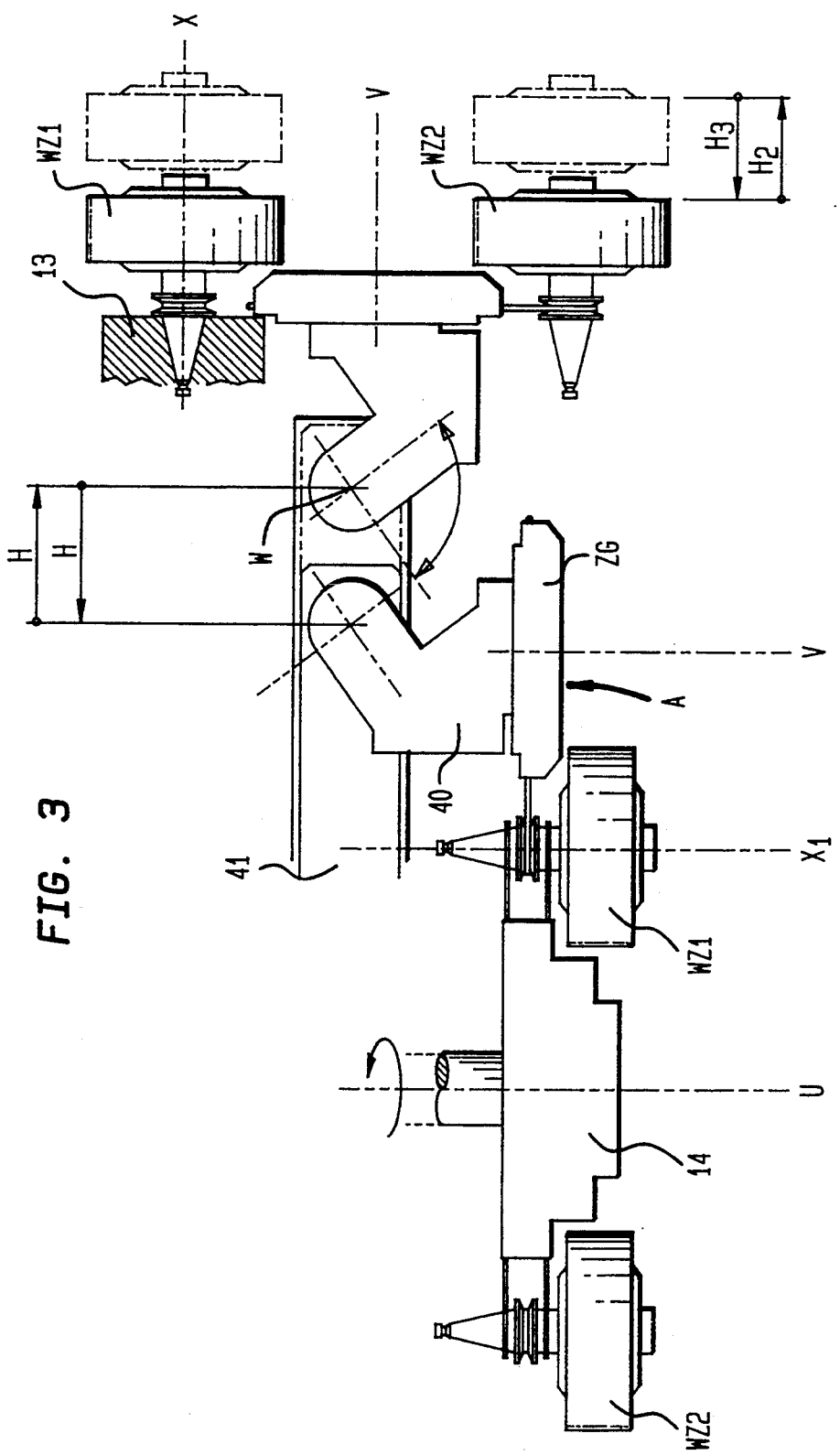
Figure 4:
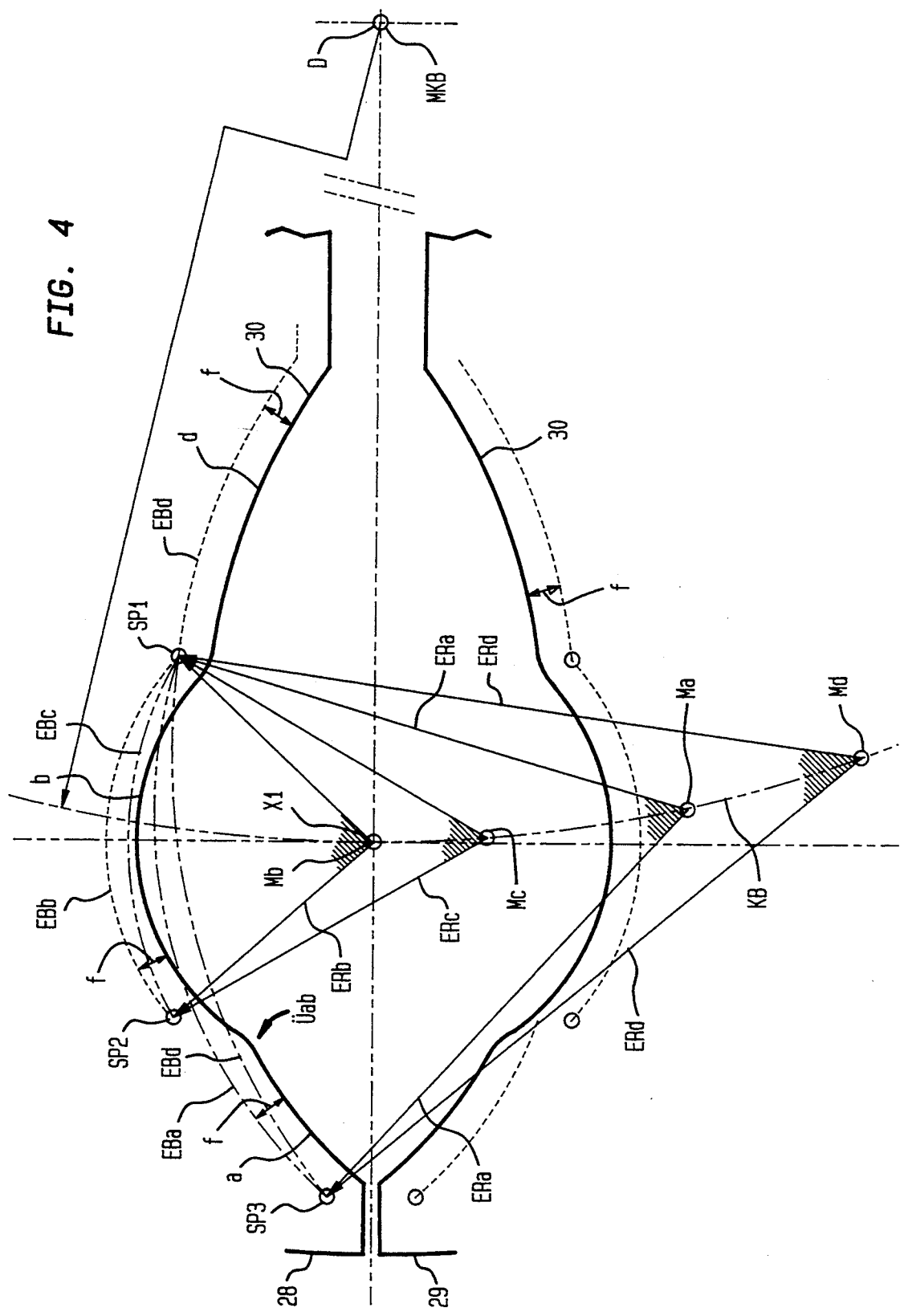
Figure 5:
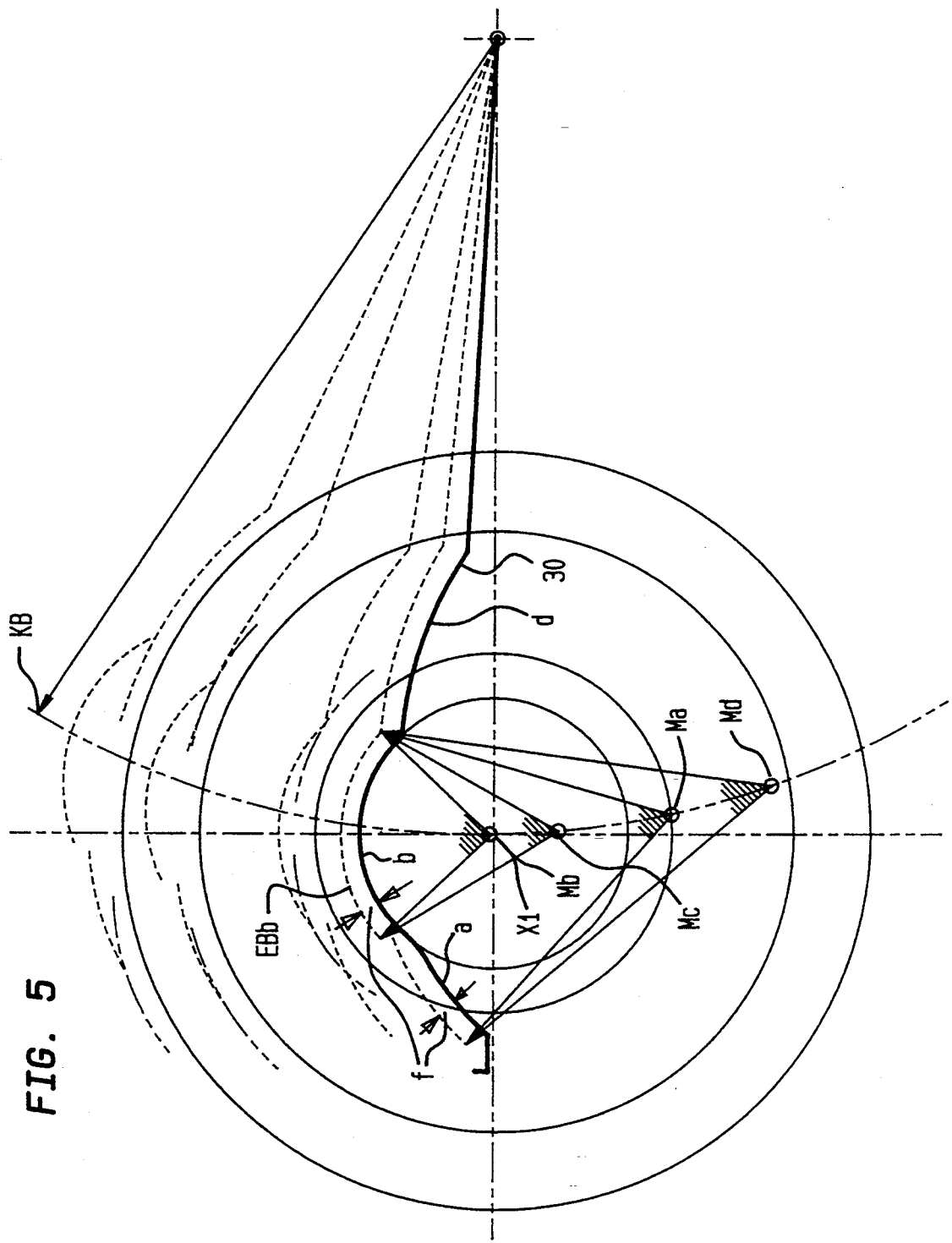
Figure 6:
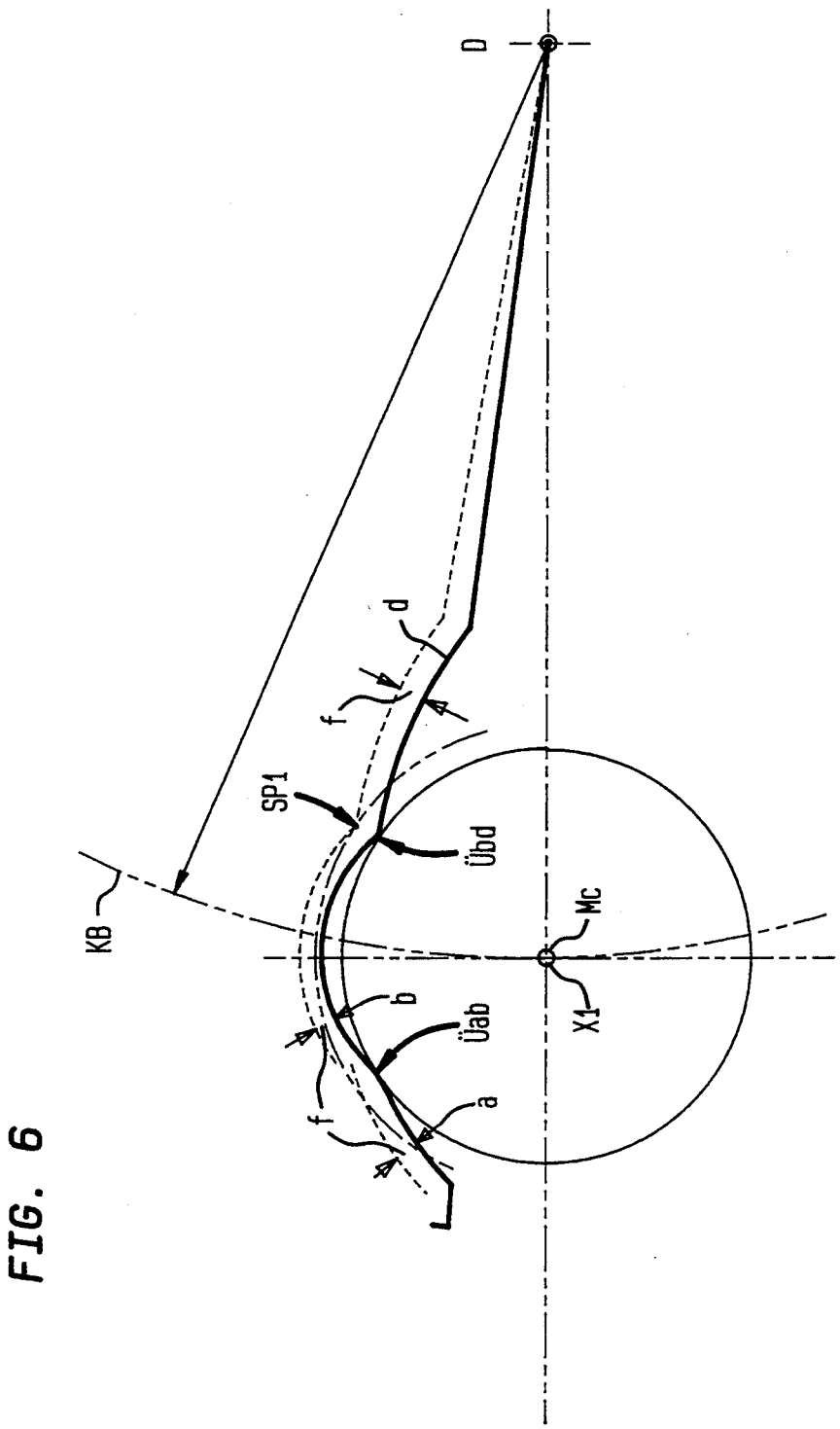
Figure 7:
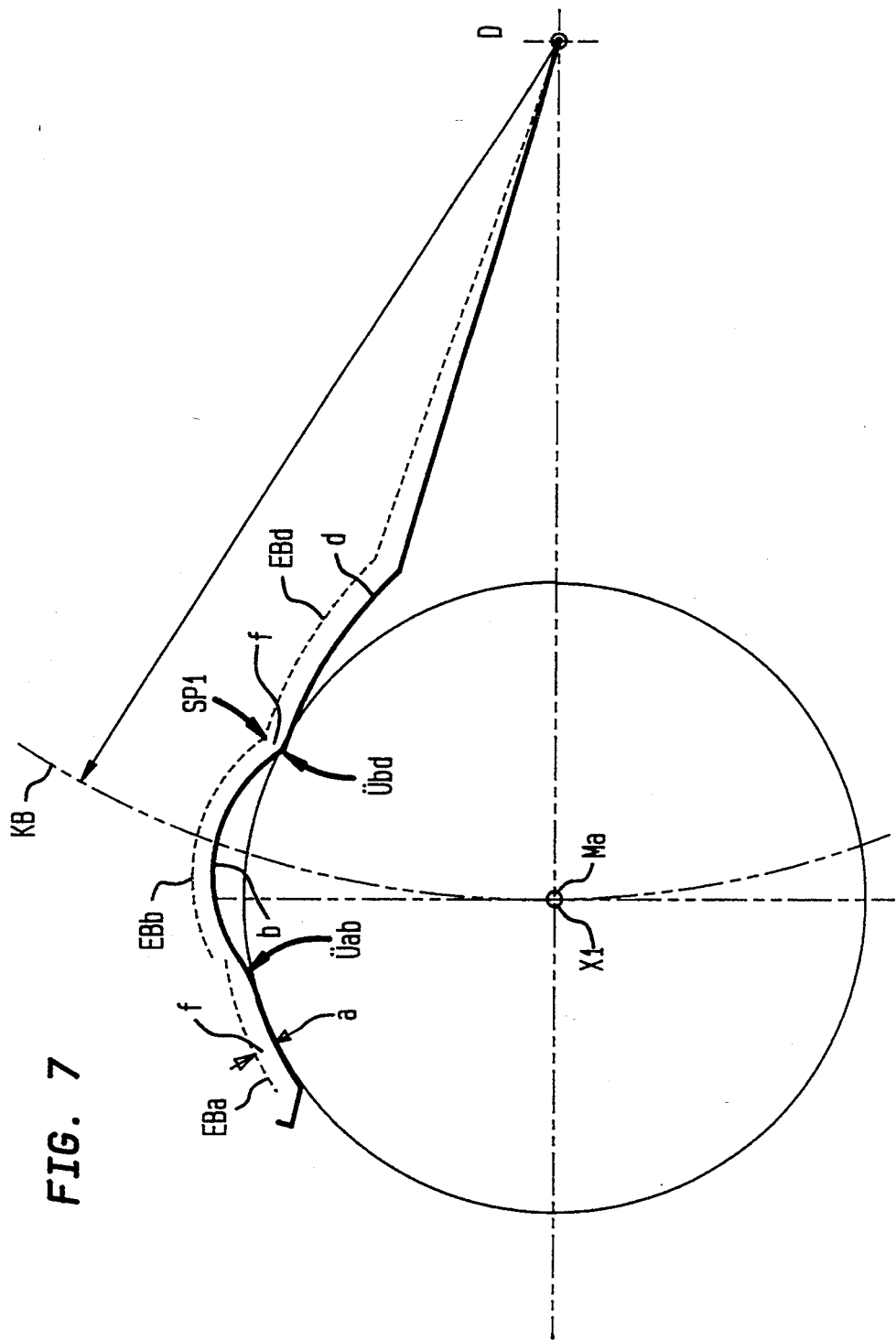
Figure 8:
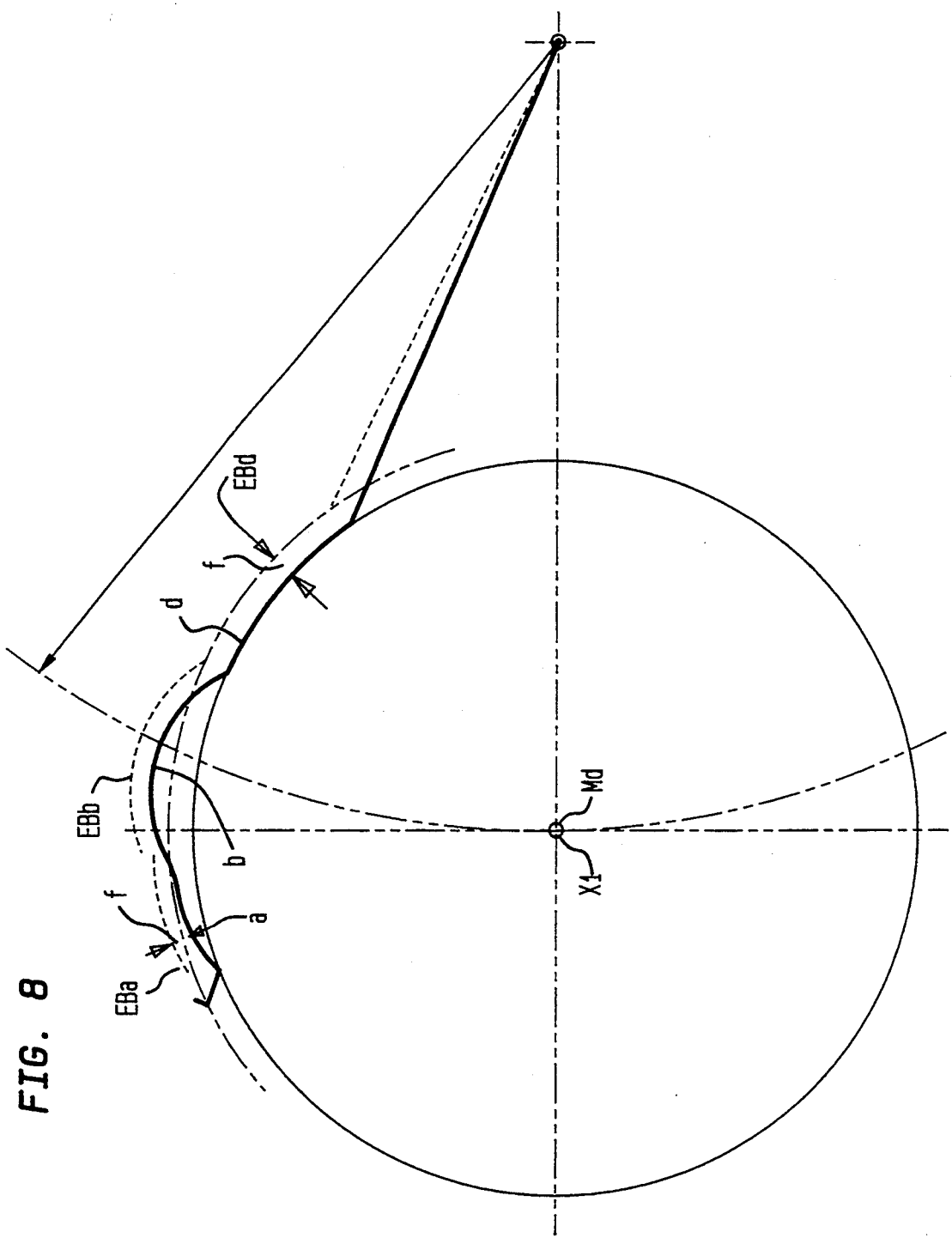
Figure 9:
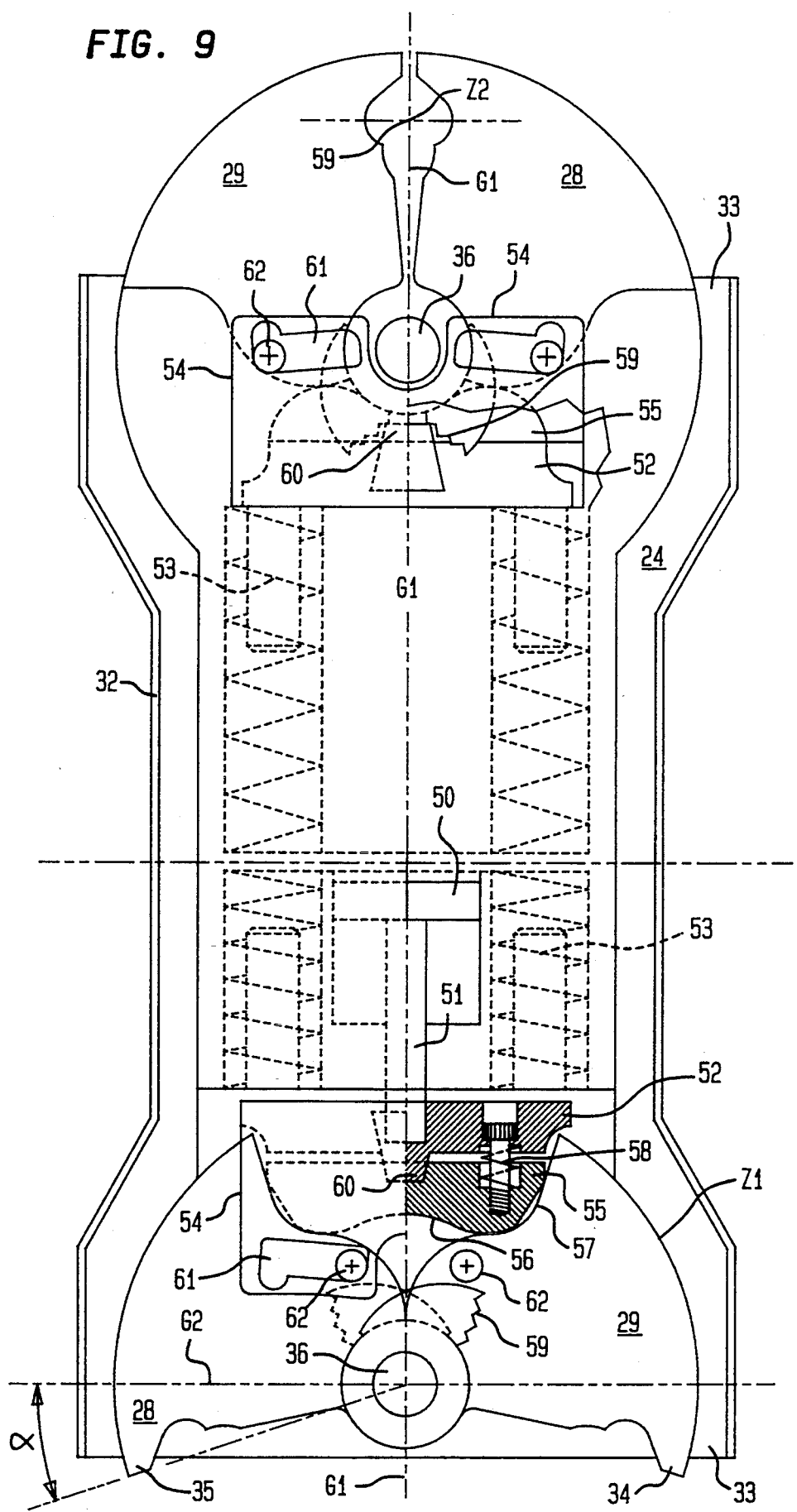

The following exemplified embodiment of the invention shows further advantageous features and particulars which are described and explained in more detail with reference to the illustration in the drawings, in which FIG. 1 is a schematic overall top view of the device, FIG. 2 is a schematic illustration of the tool changing device, FIG. 3 is the illustration according to FIG. 2 in a modified configuration, FIG. 4 shows the geometry of the jaw profile of a tongs-type grab according to the invention, FIG. 5 shows the tongs-type grab according to FIG. 4 during grasping of a smallest tool shank, FIG. 6 shows the tongs-type grab according to FIG. 4 for a next greater tool shank, FIG. 7 shows the tongs-type grab according to FIG. 4 for a still greater shank shaft, FIG. 8 shows the tongs-type grab according to FIG. 7 for the greatest tool shank, and FIG. 9 shows a double tongs-type grab according to the invention.

FIG. 1 shows a machining center created by the device according to the invention and united on a machine stand 1. This machining center includes a tool magazine console 2 with the tool magazine 14 and a column guide 3 on which the column console 4 travels. Further provided is a tailstock guiding mechanism 5 for enabling a traveling of the tailstock 6. 7 refers to an automatic pallet gear box which is not described and illustrated in more detail.

Provided on the column console 4 is a vertically movable adapter element 45 with the attachment surface 46 for connection of the tools spindle unit 10.

FIG. 1 further shows how the tool spindle unit 11 provided in stand-by position 16 of the tool spindle unit changing apparatus slides on a guiding path 43 and 44 extending in transverse direction R to the spindle axis X and is transferable to a changing position 42 on a second guiding path 43 extending coaxially to the spindle axis X. Traveling therealong is the tool spindle unit 10 or 11 until reaching the column console 4 for connection to the attachment surface 46. This arrangement allows a random exchange of the tool spindle units 10, 11 in the initial position A.

The tools WZ are placed at the tool changing unit 14 and inserted in the spindle 13 by a tongs-type grab ZG arranged on the console 13.

FIGS. 2 and 3 illustrate the tool change with the tool change unit according to the invention. The structure of the tool change unit includes an arrangement of the tongs-type grab ZG which is pivotable about a horizontal axis V on a console 40 which is rotatable by 90° about a vertical axis W by means of a power drive and is moved along a guiding path 41 in direction parallel to the tool spindle axis X about a stroke step H into its changing position for grasping the tool WZ. Only one stroke in direction of the spindle axis X is necessary in order to remove the tool grasped by the tongs ZG from the spindle 13. Two solutions are illustrated in FIGS. 2 and 3. According to FIG. 2, the column console executes a return stroke H2 and a forward stroke H3 after pivoting the tongs-type grab by 180° in order to insert the exchanged tool into the spindle 13.

The changing of a tool WZ with a same or differently sized shank or taper is provided according to FIG. 3 in a manner that in the initial position A of the double tongs-type grab ZG the first tongs Z1 grasps the first tool WZ1 situated in the tool magazine 14 and that through shifting about the stroke step H and turning of the console 40 by 90° about the vertical axis W the second tongs Z2 grasps a second tool WZ2 situated in the spindle and pulled out from the spindle 13 by a second stroke step H2. Thereafter, the first tool WZ1 is positioned before the spindle 13 through pivoting of the tongs-type grab ZG by 180° about the horizontal axis V and inserted in the spindle 13 through executing a—third—reversing stroke step H3. Through turning back the console 40 by 90° about the vertical axis W and shifting about the base stroke step H, the tongs-type grab ZG travels into the initial position A in which the second tool WZ2 is placed into the tool magazine 14.

FIG. 4 shows the jaw profile 30 of the tongs-type grab ZG according to the invention. The jaw profile 30 of both mirror-image grab jaws 28, 29 is formed by three adjoining arched sections a, b, d, with their radii matching the different diameters of the shank sizes or taper sizes.

The portions of the arched sections a, b, d are spaced by a distance f from the pertaining generating arcs EBa, EBb, EBd, with their respective generating radii ERa, ERb, ERd being greater by a distance f than the radii of the respective arched sections a, b, d. The centers of circle Ma, Mb, Md of the generating arcs EBa, EBb, EBd as well as the center of circle Mc of a further generating arc EBc with the generating radius ERc extend on an opening arc KB which intersects the feed and removal axis Z1 which may coincide with the spindle axis X, with the generating center of circle MKB of the opening arc coinciding with the pivot point D of the pivotable grab jaws 28, 29.

The centers of circle Ma, Mb, Mc, Md of all generating arcs EBa, EBb, EBc, EBd for the varying shank diameters of the tools WZ to be grasped coincide at the respective opening widths of the grab jaws 28, 29 with the feed and removal axis X1, with all generating radii ERa, ERb, ERc, ERd defining a first point of intersection SP1 in which the generating arcs EBb and EBd meet. Each two neighboring generating radii ERb and ERc and EBa and EBd define a second and third point of intersection SP2 and SP3, and the generating arcs EBa and EBb extend between these points of intersection SP2, SP3, and the generating arc EBd with the greatest generating radius ERd extends in direction of the pivot bearing 36.

In FIG. 5 the tongs-type grab is shown grasping with the arched section b the smallest tool shank as illustrated by a full circle. The center of circle Mb coincides with the feed and removal axis X1. Illustrated in dash-dot-line is the outer diameter of the tool shank which is provided in this example with a trapezoidal groove and extends further to the outside by exactly the distance f and thus coincides with the generating arc EBb. In addition, this FIGURE further depicts the greater tool shank diameters of three further tools as additional full circles with pertaining outer diameters illustrated in dash-dot-lines as well as the respective pattern of the generating arcs illustrated in broken lines. These three further positions are illustrated in more detail in FIGS. 5–7.

In FIG. 6 the tongs-type grab ZG is shown grasping the next greater tool shank as illustrated in full circle with the transition areas Üab and Übd in which the points of intersections of the jaw profile are rounded. The center of circle Mc coincides with the feed and removal axis Z1. Illustrated by dash-dot-line is the outer diameter of the grasped tool shank which in this example is provided with a trapezoidal groove and lies further to the outside by exactly the distance f and extends approximately through the first point of intersection SP1.

In FIG. 7 the tongs-type grab is shown grasping the next greater tool shank as illustrated by a full circle with the transition area Übd and with the circular portion of the arched section a extending in the area of the third point of intersection SP3. The center of circle Ma coincides with the feed and removal axis X1. Illustrated in dash-dot line is the outer diameter of the grasped tool shank which in this example is provided with a trapezoidal groove and lies further to the outside by exactly the distance f and extends approximately through the first point of intersection SP1.

In FIG. 8 the tongs-type grab is shown grasping the greatest tool shank as illustrated by a full circle with a point of the circular portion of the arched section a in the area of the third point of intersection SP3 and with the circular portion of the arched section d. The center of circle Md coincides with the feed and removal axis X1. Illustrated in dash-dot-line is the outer diameter of the grasped tool shank which in this example is provided with a trapezoidal groove and lies further to the outside by exactly the distance f and thus coincides with the generating arc EBb.

FIG. 9 shows a power-operated double tongs-type grab ZG according to the invention, with the respectively opposing grab jaws 28, 29 which are mirror images of each other being formed to receive tools WZ with different shank sizes or taper sizes. The first tongs Z1 is illustrated fully opened and the second tongs Z2 is illustrated in the fully closed position. The grab jaws 28, 29 are held in pivot bearings 36 in a base plate 24 which is pivotable about 90° and 180° and complemented by a cover plate to form a grab housing 32 which is provided on both sides with openings 33 for allowing an escape of the jaws 28, 29. As can be seen, the grab jaws 28, 29 of the first tongs Z1 are retracted in their greatest opening position with their outer jaw ends 34, 35 in the opening 33 of the grab housing 32 and form an angle α between 15° and 25° relative to transverse axis $G_2$ which intersects the pivot bearing 36 and extends perpendicular to the longitudinal grab axis $G_1$.

The drive for moving the grab jaws 28, 29 is effected for each grab tongs by a separate piston-cylinder unit 50, the piston rods 51 of which being connected with a respective longitudinally shiftable abutment 52. This abutment as driven by the piston rods 51 exerts a counterpressure in opening direction upon the grab jaws 28, 29 in opposition to the force of a compression spring arrangement 53 effecting the closing pressure, with a compressor 55 being incorporated between the abutment 52 and the grab jaws 28, 29 and including pressure lugs 6. These pressure lugs 6 transmit the closing pressure of the compression springs 53 directly upon the grab jaws 28, 29 by sliding under this spring pressure along the rearwardly formed profile curves 57. A close, play free contact of the pressure lugs 56 of the compressor is continuously obtained.

On their rear side, the grab jaws 28, 29 are provided with projections 63 which include stepped lock-in teeth 59. In closed position of the grab jaws 28, 29, these lock-in teeth overlap each other and form a more or less large mouth-like toothed opening. Inserted in this opening which is provided with opposing lock-in teeth 59 is in closed position of the grab jaws 28, 29 a catch 60 which is connected with the abutment 52. Thus, an unintended opening of the grab jaws is avoided.

An advantage is accomplished also by inserting between the abutment 52 and the compressor 55 a compression spring set 58 which is designed as helical spring set or disk spring set. Through this configuration, a constant closing pressure is exerted upon the clamped tools regardless of possible wear of the grab jaws 28, 29 or of the abutment 52 or the compressor 55 and regardless of the locking position of the lock-in teeth 59.

For opening the grab tongs, each abutment is connected to a transfer element 54 which is essentially a flat plate and extends in direction of the grab jaws 28, 29, that is (in top view) above and below thereof and within sunk-in recesses. Provided in the plate-type transfer element 54 are on each side for each pair of grab jaws 28, 29 slotted guides 61 in which return pins 62 slide which are mounted to the grab jaws 28, 29. Through the return movement of the piston rods 51 and the transfer element 54 connected therewith with the slotted guides 61, the return pins 62 and thus the grab jaws are moved in opening direction in opposition to the spring force.

We claim:

1. Device for metal cutting a workpiece in a clamping fixture by tools which are removable from a tool magazine and positionable in alternating sequence into their working position, comprising
    A.1 a control unit for clocked sequence control of the algorithmically preset machining steps until reaching the finished size of the workpiece,
    A.2 a tool spindle unit changing apparatus, with the tool spindle unit (10) which respectively occupies the working position being inserted in a holding fixture and removable therefrom and exchangeable for a tool spindle unit (11) readied in stand-by position and
    A.3 a tool changing unit for turning tools, drilling tools, milling tools and grinding tools, comprised of a power-operated movable and rotatable as well as pivotable tongs-type grab with openable and closable grab jaws which are alignable to the respective tool removal axis and spindle axis (X), characterized in that
    B.1 the grab jaws (28, 29) has a jaw profile (30) which are mirror images of each other for receiving tools (WZ) with more than two different shape sizes or taper sizes, and
    B.2 with each jaw profile (30) having at least three adjoining arched sections (a, b, d), the radii thereof matching the different diameters of at least three shank sizes or taper sizes.

2. Device according to claim 1, characterized in that
    C.1 the arched sections (a, b, d) are spaced by a distance (f) from the pertaining generating arcs (EBa, EBb, EBd), with their generating radii (ERa, ERb, ERd) being greater by the distance (f) than the radii of the arched sections (a, b, d),
    C.2 with the centers of circle (Ma, Mb, Md) of the generating arcs (EBa, EBb, EBd) as well as the center of circle (Mc) of a further generating arc (EBc) with the generating radius (ERc) lying on an opening arc (KB) which intersects the feed and removal axis (X1), with the generating center (MKB) of the opening arc (KB) coinciding with the pivot point (D) of the pivotable grab jaws (28, 29), and upon which C.3 the centers (Ma, Mb, Mc, Md) of all generating arcs (EBa, EBb, EBc, EBd) for the different shank diameters of the tools (WZ) being grasped coincide with the feed and removal axis (X1) at the respective opening widths of the grab jaws (28, 29).

3. Device according to claim 2, characterized in that all generating radii (ERa, ERb, ERc, ERd) define a first point of intersection (SP1) in which the generating arcs (EBb and EBd) meet and each two neighboring generating radii (ERb, ERc and ERa, ERd) define a second and third point of intersection (SP2, SP3), and that the generating arcs (EBa, EBb) extend between these points of intersection and that the generating arc (EBd) with the greatest generating radius (ERd) extend from the first point of intersection in direction of the pivot bearing (36).

4. Device according to claim 1, characterized in that the power-operated grab jaws (28, 29) are held in a pivotable base plate (24) in pivot bearings (36).

5. Device according to claim 4, characterized in that the base plate (24) of the jaws (28, 29) is pivotable by 180°.

6. Device according to claim 4, characterized in that the base plate (24) of the jaws (28, 29) is pivotable by 90°.

7. Device according to claim 4, characterized in that two tongs (GZ) oppose each other as mirror images on the base plate (24) with regard to a longitudinal axis (G1) of the grab.

8. Device according to claim 4, characterized in that the base plate (24) is complemented by means of a cover plate to a grab housing (32) which has on both sides openings (33) for escape of the grab jaws (28, 29).

9. Device according to claim 4, characterized in that the grab jaws (28, 29) are retracted in their greatest opening position with their outer jaw ends (34, 35) in the openings of the grab housing (32).

10. Device according to claim 4, characterized in that the outer jaw ends (34, 35) of the grab jaws (28, 29) form in the greatest opening position an angle ($\alpha$) between 15° and 25° relative to a transverse axis (G2) which intersects the pivot bearing (36) and extends perpendicular to the longitudinal axis (G1) of the grab.

11. Device according to claim 4, characterized in that each pair of grab jaws (28, 29) is associated to a separate piston-cylinder unit (50), with their piston rods (51) being connected with a respective longitudinally shiftable abutment (52) of a compression spring arrangement (53) which exerts a closing pressure upon the grab jaws and with a transfer element (54, 60, 61) which exerts a piston stroke in opening direction in opposition to the spring pressure.

12. Device according to claim 11, characterized in that a compressor (55) is inserted between the abutment (52) and the grab jaws (28, 29) and includes on both sides pressure lugs (56) by which the closing pressure of the compression springs (53) is slidingly transmitted upon the grab jaws (28, 29) along rearwardly formed profile curves (57).

13. Device according to claim 4, characterized in that both grab jaws (28, 29) are provided on their rear side with projections (63) which oppose each other as mirror images and are provided with adjoining stepped lock-in teeth (59), with a catch (60) which is connected with the abutment (52) being inserted between the projections (63).

14. Device according to claim 11, characterized in that compression spring sets (58) are inserted between the abutment (52) and the compressor (55).

15. Device according to claim 11, characterized in that the transfer element (54) which is connected with the abutment (52) is provided on both sides—for each grab jaw (28, 29)—with slotted guides (61) in which return pins (62) which are mounted to the jaws (28, 29) slide.

16. Device according to claim 4, characterized by
a) an arrangement of the tongs-type grab (ZG) which is pivotable about a horizontal axis (v) on a console (40) which is rotatable about a vertical axis (w) by means of a power drive and
b) is movable forwards and backwards in direction parallel to the tool receiving axis or spindle axis (Z) on a guiding path (41) by at least one stroke step.

17. Device according to claim 16, characterized in that in the initial position (A) of the double tongs-type grab (ZG) a first tool (WZ1) situated in the tool magazine (14) is grasped by the first tongs (X1) and a second tool (WZ2) situated in the spindle (13) is grasped through movement about a stroke step (H1) and rotating of the console (40) by 90° about the vertical axis (w) by means of the second tongs (Z2) and pulled out from the spindle (13) through a return stroke step (R) of the tool spindle unit (10) and that subsequently the first tool (WZ1) is positionable before the spindle (13) through pivoting of the tongs-type grab (ZG) by 180° about the horizontal axis (v) and insertable into the spindle (13) through executing a—further—reversing return stroke step (R) and subsequently movable through turning back the console (40) by 90° about the vertical axis (w) and travel about the reversing stroke step (H2) into the initial position (A) in which the second tool (WZ2) is insertable in the tool magazine (14).

18. Device according to claim 16, characterized in that in the initial position (A) of the double tongs-type grab (ZG) a first tool (WZ1) situated in the tool magazine (14) is grasped by the first tongs (X1) and through movement by a stroke step (H1) and turning of the console (40) by 90° about the vertical axis (w) a second tool (WZ2) situated in a spindle is grasped by the second tongs (Z2) and pulled out through a return stroke step (H2) from the spindle, and that subsequently through pivoting of the tongs-type grab (ZG) by 180° about the horizontal axis (v) the first tool (WZ1) is positioned before the spindle (13) and inserted in the spindle (13) through execution of a—third—reversing stroke step (H3), and thereafter through turning back of the console (40) by 90° about the vertical axis (w) and traveling about the reversing stroke step (H4) is movable into the initial position (A) in which the second tool (WZ2) is insertable in the tool magazine (14).

19. Device according to claim 16, characterized in that in the initial position (A) of the tongs-type grab (ZG) a first tool (WZ1) situated in the tool magazine (14) is grasped by the first tongs (X1) and through traveling about a first stroke step (H1) and pivoting by 90° about the horizontal axis (v) as well as turning of the console (40) by 90° about the vertical axis (w) as well as returning of the tongs-type grab (ZG) by 90° about the horizontal axis (v) a second tool (WZ2) situated in the spindle (13) is grasped by the second tongs (Z2) and pulled out by a second stroke step (H2) from the spindle (13), and that subsequently through pivoting of the tongs-type grab (ZG) by 180° about the horizontal axis (v) the first tool (WZ1) is positioned before the spindle

(13) and inserted in the spindle (13) through execution of a—third—reversing stroke step (H3), and thereafter is moved through pivoting of the tongs-type grab (ZG) by 90° about the horizontal axis (v) and turning back of the console (40) by 90° about the vertical axis (w), returning of the tongs-type grab (ZG) by 90° about the horizontal axis (v) and traveling by the reversing stroke step (H4) into the initial position (A) in which the second tool (WZ2) is insertable in the tool magazine (14).

20. Device according to claim 1 characterized in that the tool spindle unit changing apparatus comprises D.1 a vertical column console (4) arranged on a common column machine stand (1) as well as D.2 a tool spindle unit (10) operatively connected therewith detachably and exchangeably, and D.3 a (first) shifting path (41) underneath the tool spindle unit (10) which is operatively connected with the column console (4) for directional displacement of the tool spindle unit (10) detached from the column console (4) from its working position (AP) into a stand-by position (16) at a distance to the column console (4).

21. Device according to claim 20, characterized in that the (first) shifting path (43) is provided with a liftable and lowerable section underneath the tool spindle unit (10) which is arranged in working position (AP).

22. Device according to claim 20, characterized in that the column console (4) or its adapter element (45) for the detachable connection with the tool spindle unit (10) is lowerable from the respective working position (AP).

23. Device according to claim 20, characterized in that the (first) shifting path (43) includes on its end a branch or a rotating disk (42) which is connected to a further (second) shifting path (44) provided as stand-by position (16) for a number of tool spindle units (10, 11) or leading thereto.

24. Device according to claim 22, characterized in that the first shifting path (43) is rectilinear and the second shifting path (44) connected on both sides at a right angle to the end of the first shifting path (43) is provided as stand-by position (16) for a plurality of tool spindle units (10, 11).

25. Device according to claim 20, characterized in that the tool spindle units (10) are provided with a synchronous motor arranged directly on the spindle shaft.

26. Device according to claim 20, characterized in that the frequency generator for the synchronous motor is arranged in the area of the adapter element (45) of the column console (4) for detachable connection with the tool spindle unit (10) situated in working position (AP) in or on the column console (4).

27. Device according to claim 20, characterized in that the adapter element (45) of the column console (4) and the attachment surfaces (46) of the tool spindle units (10) are provided with remote-controlled pressure fluid operated fitting and armature devices and rapid connections for the current transmission.

* * * * *

UNITED STATES PATENT AND TRADEMARK OFFICE
CERTIFICATE OF CORRECTION

PATENT NO. : 5,437,592
DATED : August 1, 1995
INVENTOR(S) : Udo Klicpera & Bernd Schlieter It is certified that error appears in the above-indentified patent and that said Letters Patent is hereby corrected as shown below:

On the title page, item [73], change "Schiess Kopp Werkzeugmaschinen GmbH" to --KOPP WERKZEUGMASCHINEN GMBH--.

Signed and Sealed this

Twenty-eighth Day of January, 1997

Attest:

BRUCE LEHMAN

Attesting Officer    Commissioner of Patents and Trademarks